(12) United States Patent
Bastein et al.

(10) Patent No.: US 8,226,121 B2
(45) Date of Patent: Jul. 24, 2012

(54) STEERING COLUMN ARRANGEMENT FOR MOTOR VEHICLES

(75) Inventors: Christian Bastein, Hollern-Twielenfleth (DE); Philip Bockshammer, Hamburg (DE); Jens Bohlen, Eyendorf (DE); Karsten Braeuer, Tostedt (DE); Heiko Holst, Osterhorn (DE); Holger Kittler, Hamburg (DE); Hans Kluemper, Voegelsen (DE); Sven Sagner, Hamburg (DE); Carsten Sass, Hamburg (DE)

(73) Assignee: Daimler AG, Stuttgart (DE)

( * ) Notice: Subject to any disclaimer, the term of this patent is extended or adjusted under 35 U.S.C. 154(b) by 38 days.

(21) Appl. No.: 12/741,977

(22) PCT Filed: Sep. 10, 2008

(86) PCT No.: PCT/EP2008/007394
§ 371 (c)(1),
(2), (4) Date: Sep. 14, 2010

(87) PCT Pub. No.: WO2009/059655
PCT Pub. Date: May 14, 2009

(65) Prior Publication Data
US 2011/0006510 A1   Jan. 13, 2011

(30) Foreign Application Priority Data
Nov. 10, 2007   (DE) .................. 10 2007 053 672

(51) Int. Cl.
*B62D 1/18* (2006.01)
(52) U.S. Cl. ..................... 280/775; 280/777; 74/493
(58) Field of Classification Search ............. 280/775, 280/777; 74/492, 493
See application file for complete search history.

(56) References Cited

U.S. PATENT DOCUMENTS

| | | | |
|---|---|---|---|
| 3,434,368 A * | 3/1969 | Runkle | 74/493 |
| 3,491,614 A * | 1/1970 | Demske et al. | 74/493 |
| 5,492,430 A * | 2/1996 | Jones | 403/109.5 |
| 7,267,025 B2 * | 9/2007 | Ko et al. | 74/493 |
| 7,350,815 B2 | 4/2008 | Spano et al. | |
| 7,475,908 B2 * | 1/2009 | Senn | 280/775 |
| 7,607,696 B2 | 10/2009 | Graf | |
| 2007/0252372 A1 * | 11/2007 | Spano et al. | 280/775 |
| 2008/0072700 A1 * | 3/2008 | Ohtsu et al. | 74/493 |
| 2009/0151498 A1 | 6/2009 | Garbrecht et al. | |

FOREIGN PATENT DOCUMENTS

| | | | |
|---|---|---|---|
| DE | 10 2004 051 060 B3 | | 1/2006 |
| DE | 10 2005 056 308 B3 | | 3/2007 |
| DE | 10 2006 009 304 B3 | | 7/2007 |
| WO | WO 2006042604 A1 * | | 4/2006 |

OTHER PUBLICATIONS

International Search Report and Written Opinion dated Nov. 27, 2008 with translation of relevant portions thereof (12 pages).
German Office Action dated Nov. 25, 2008 (2 pages).

* cited by examiner

*Primary Examiner* — Joseph Rocca
(74) *Attorney, Agent, or Firm* — Crowell & Moring LLP

(57) ABSTRACT

A steering column arrangement for motor vehicles with a vehicle-side console, on which an outer tube of a steering column carrying a steering shaft is attached in a releasable manner by means of a clamping device. The clamping device comprises at least one clamping wedge arrangement by which an increased holding force of the clamping device can be achieved during an axial displacement of the outer tube caused by an accident.

8 Claims, 2 Drawing Sheets

STEERING COLUMN ARRANGEMENT FOR MOTOR VEHICLES

This application is a national stage of PCT International Application No. PCT/EP2008/007394, filed Sep. 10, 2008, which claims priority under 35 U.S.C. §119 to German Patent Application No. 10 2007 053 672.2, filed Nov. 10, 2007, the entire disclosure of which is herein expressly incorporated by reference.

BACKGROUND AND SUMMARY OF THE INVENTION

The invention relates to a steering column arrangement for a motor vehicle.

A steering column of the generic type is known, for example, from German patent document DE 10 2006 009 304 B3. It comprises a console on the vehicle side, at which an outer tube of a steering column mounting a steering shaft can be fixed in a releasable manner by means of a clamping device. Respective laminated disk packs are thereby associated with the clamping device, which packs are fastened on the console side or on the steering shaft side and cooperate with each other in a clamping manner. So as to achieve a certain resilience with a force application of the steering column caused by an accident, at least one blade of the one laminated disk pack can be deflected when a load acting on the steering column in the direction of its longitudinal center axis in the transverse axis to the steering column longitudinal center axis exceeds a limit.

One object of the present invention is to provide a steering column arrangement for a motor vehicle (in particular a passenger vehicle) in which axial displacement of the outer tube caused by an accident is limited in a particularly advantageous manner.

This and other objects and advantages are achieved by the steering column arrangement according to the invention, in which the clamping device comprises at least one clamping wedge arrangement, which generates an increased holding force with an axial displacement of the outer tube caused by an accident. In other words, it is provided according to the invention to generate an increased clamping force or holding force of the clamping device in that a corresponding clamping wedge arrangement is provided, which generates an increased holding force between the console on the vehicle side and for example the outer tube of the steering column with an axial forward dislocation of the outer tube.

During the axial displacement of the outer tube, the increased holding force or clamping force of the clamping device is thereby generated in a simple and reliable manner in that clamping wedges corresponding to each other in a corresponding manner or other means of the clamping wedge arrangement are displaced against each other correspondingly, which leads to the increased holding force, which acts essentially transversely to the axial displacement or forward dislocation of the outer tube In a further arrangement of the invention, it has furthermore been shown to be advantageous if the clamping wedge arrangement comprises two clamping wedges arranged laterally of the outer tube, which cooperate with corresponding console wedge legs of the console for generating the holding force during an axial displacement of the outer tube caused by an accident. These clamping wedges can be produced in a particularly simple and cost-efficient manner and can generate the increased holding force or clamping force of the clamping device in a particularly simple and advantageous manner, by displacing these against the corresponding console wedge legs of the console. It is however also conceivable to arrange only a single clamping wedge laterally of the outer tube in a constructive simplification of the clamping wedge arrangement.

It has further been shown to be advantageous if the clamping wedges can be displaced with the outer tube in its axial direction. In other words, it has been shown to be particularly advantageous if the initial movement of the outer tube is transferred directly or indirectly to the clamping wedges with a force application caused by an accident, whereby the clamping wedges are displaced relative to the corresponding console wedge legs, so as to generate the increased holding or clamping force hereby.

In a further arrangement of the invention, a higher friction coefficient is provided between the clamping wedges and the outer tube than between the clamping wedges and the respectively corresponding console wedge legs. It is ensured in this manner that the clamping wedges are taken along therewith during a forward dislocation of the outer tube caused by an accident, while the correspondingly desired displacement takes place relative to the corresponding console wedge legs for generating the holding force acting transversely to the forward dislocation.

A further advantageous embodiment provides that the clamping wedges are provided with elongated holes proceeding in the axial direction of the tube, through which passes a clamping bolt of the clamping device. In this manner, a particularly good hold or guide of the clamping wedge is given with an axial forward dislocation or displacement of the outer tube—and a displacement of the clamping wedges in conjunction therewith.

When a holding limit force is exceeded, it has been shown to be advantageous in a further arrangement of the invention if a plastic deformation takes place in the region of the clamping device. In this manner, a form-fit blockade of the clamping system or of the clamping device is achieved, which is desired for the further progress of the accident scenario.

The outer tube can be formed in one piece. In a further arrangement of the invention, it is however formed in several parts, wherein a first outer tube part can be loaded with an increased holding force of the clamping device during an axial displacement of the outer tube caused by an accident, and the other outer tube part can be moved relative to the first outer tube while absorbing energy. In other words, a slight movement of the first outer tube part initially takes place during a force application caused by an accident, until this is fixed correspondingly by the increased holding force, whereafter the relative movement of the first outer tube part can take place by means of energy absorption. A particularly advantageous force progression, possibly in stages, can be achieved hereby while absorbing impact energy.

It is further advantageous if a further clamping element of the clamping device is arranged on the outside of the respective console wedge leg. The design of a clamping element in the shape of a wedge is especially advantageous if an especially good holding force is necessary in the case of a crash for avoiding an undesired height displacement of the outer tube. It is however generally also conceivable to design the outer side of the console wedge leg or/and the inner side of the clamping element parallel to the outer tube. It can be seen to be advantageous thereby if the outer side and/or the inner side are designed in a friction-increasing manner, for example by means of a corresponding coating. This particularly ensures the remaining in the adjusted height displacement position in the regular drive operation.

It has finally been shown to be advantageous if the console wedge legs have a respective stop, by which an axial displacement of the clamping wedges can be limited. A maximum displacement path of a maximum forward dislocation of the outer tube can hereby be adjusted in a particularly simple manner. A limitation of the maximum wedge forces introduced into the clamping system can hereby also be achieved.

Other objects, advantages and novel features of the present invention will become apparent from the following detailed description of the invention when considered in conjunction with the accompanying drawings.

DETAILED DESCRIPTION OF THE DRAWINGS

Figure 1:
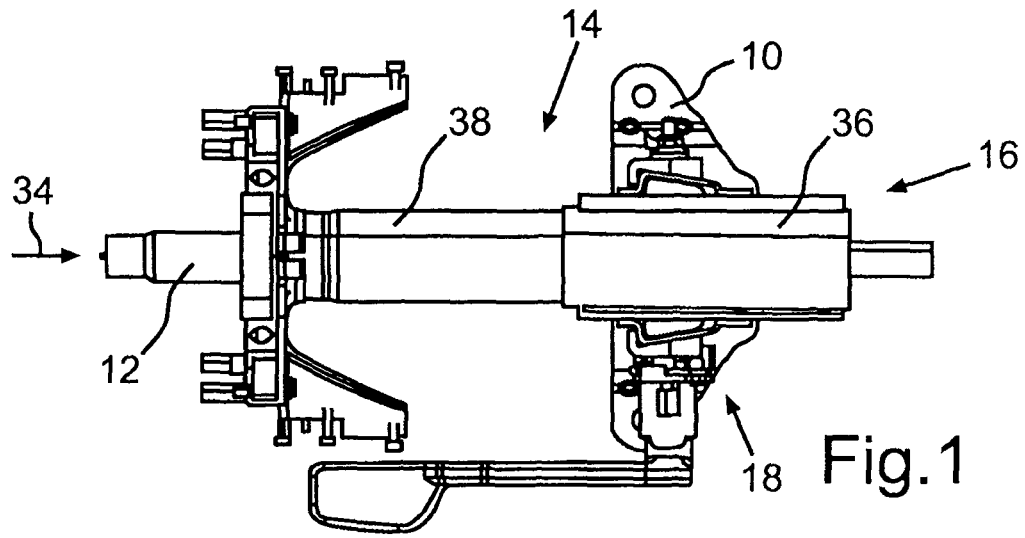
FIG. 1 is a top view of a steering column arrangement for a passenger motor vehicle with a vehicle-side console in parts, at which an outer tube of a steering column carrying a steering shaft is attached in a releasable manner by means of a clamping device, wherein the clamping device comprises a clamping wedge arrangement with two clamping wedges arranged laterally of the outer tube, which wedges cooperate with corresponding console wedge legs of the console for generating an increased holding force during an axial displacement of the outer tube caused by an accident.
Figure 2:
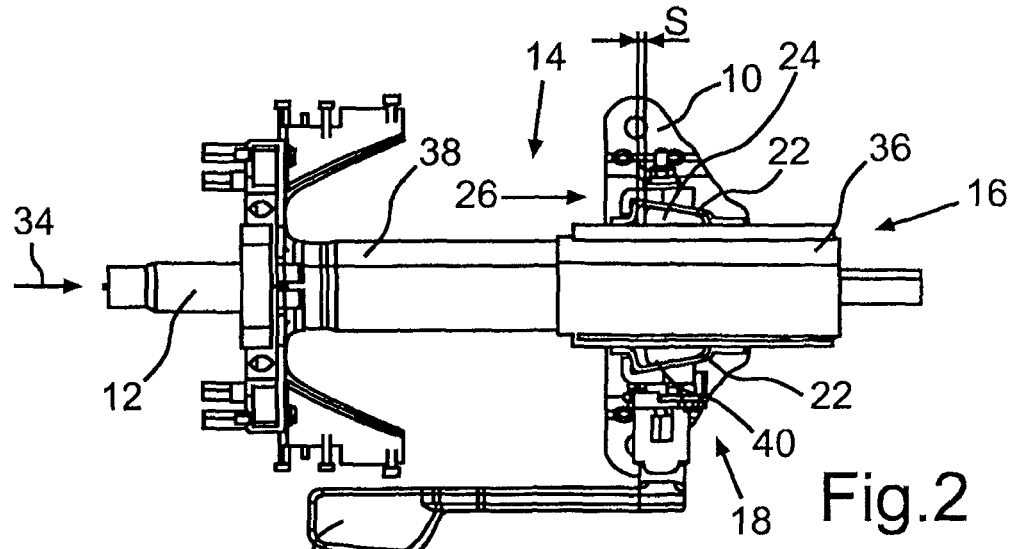
FIG. 2 is a top view of the steering column arrangement according to FIG. 1 in parts, wherein the two clamping wedges which are arranged laterally of the outer tube have been dislocated forward together due to an axial displacement of the outer tube caused by an accident with regard to the console wedge legs of the console, wherein an increased holding force of the clamping device has been generated hereby, wherein a rear outer tube part of the outer tube is fixed relative to the console.
Figure 3:
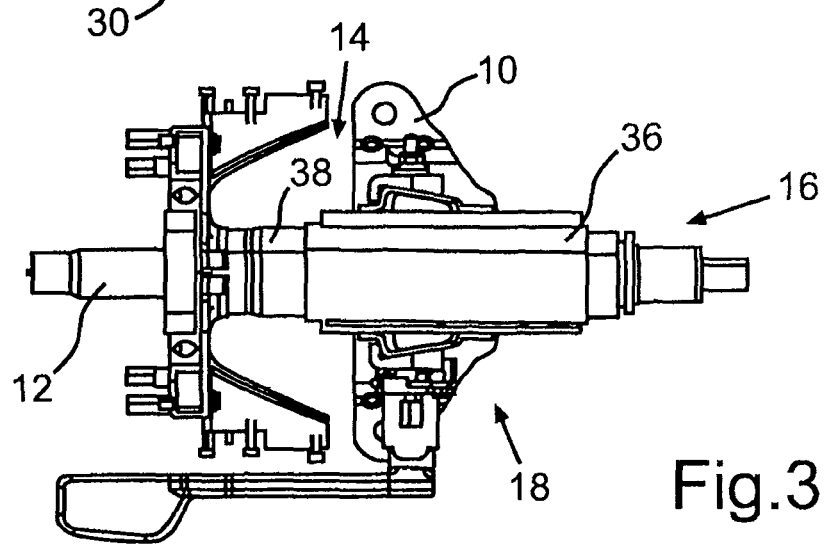
FIG. 3 is a top view of the steering column arrangement according to FIGS. 1 and 2 in parts, in which, due to the preconditioned force application of the outer tube, the rear outer tube part has been displaced or dislocated to the front relative to the front outer tube part fixed relative to the console on the vehicle side relative to the increased holding force of the clamping device.

FIGS. 1 to 3 show a top view, respectively, in parts of a steering column arrangement for a motor vehicle formed as a passenger motor vehicle here. The steering column arrangement comprises a console 10 which is vehicle-rigid or on the vehicle side, to which is fixed an outer tube 14 of a steering column 16 carrying a steering shaft 12 by means of a clamping device.

Figure 4:
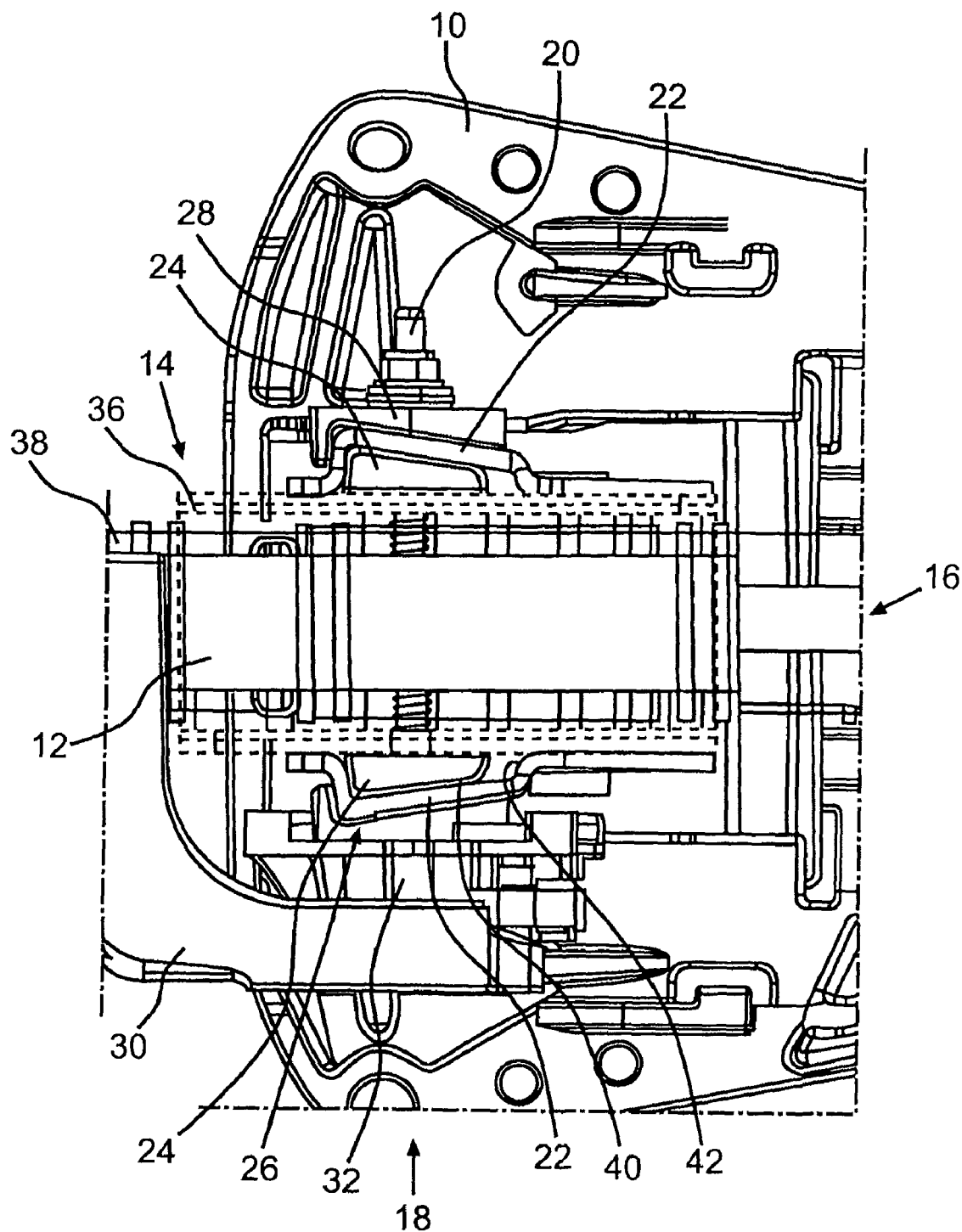
FIG. 4 is a top view in parts and which is enlarged of the clamping device with the clamping wedge arrangement of the steering column arrangement according to FIGS. 1 to 3, wherein in particular the clamping wedges on the outer tube side can be seen, which cooperate with the corresponding console wedge legs of the console for generating the holding force during an axial displacement caused by an accident.

In particular, FIG. 4 shows the steering column arrangement in the region of the clamping device 18 in an enlarged top view in parts. It can be seen that the clamping device 18 comprises a clamping bolt 20, which respectively extends between console wedge legs 22 of the console 10 which are respectively arranged laterally of the outer tube 14. The clamping bolt 20 further passes through two clamping wedges 24 arranged laterally of the outer tube 14, namely in the region of elongated holes (not shown) which extend in the axial direction of the steering column 16 or of the outer tube 14. It can thus be seen in particular from FIG. 4, that the respective lateral console wedge leg 22 and the associated clamping wedge 24 form a clamping wedge arrangement 26, whose function will be explained in more detail in the following with reference to FIGS. 1 to 3.

On the outside of the console wedge legs 22, a further wedge-shaped clamping element 28 of the clamping arrangement 18 is respectively arranged. The respective clamping element 28 and the respective console wedge leg 22 are respectively provided with an opening, through which the clamping bolt 20 projects.

The clamping device 18 presently can be clamped or released by pivoting an actuation lever 30 around a rotational axis formed by the clamping bolt 20. Hereby a wedge-shaped clamping part 32 known from the state of the art which is presently rigidly connected to the actuation lever 30 is rotated in such a manner that the axial clamping or release of the outer tube 14 relative to the console 10 results. The steering column 16, which can presently be adjusted in length or height can thus be adjusted and fixed in the adjusted position by means of the clamping device 18.

In FIG. 1, the steering column arrangement is shown in its initial position, in which it is mounted in passenger motor vehicles. If a force application or an axial overload caused by an accident results now for example due to a collision of the passenger motor vehicle, —as indicated with the arrow 34—, from the steering wheel side, the outer tube 14 (more precisely an outer tube part 36) shall be fixed over a certain path s after a corresponding axial displacement. The front or first outer tube part 36 is thereby connected to the second outer tube part 38, namely relatively rigid to each other in this movement phase.

In FIGS. 1 and 2, it can now be seen that the axial force application or the axial displacement of the first outer tube 36 part caused by an accident results in that that the clamping wedges 24 arranged laterally of the outer tube 14 or of the first outer tube part 36 are displaced forward in the axial direction of the outer tube 14, namely also by the path s which is covered by the first outer tube part 34.

The two clamping wedges 24, which are moved with the first outer tube part 36, thus experience a relative movement with regard to the corresponding console wedge legs 22. As respectively corresponding frictional surfaces 40 are directed towards the center axis of the steering column 16 between the clamping wedges 24 and the console wedge legs 22, a movement of the clamping wedges 24 inevitably results in that an increased holding or clamping force adjusts within the clamping device 18. In other words, the displacement of the clamping wedges 24 relative to the console wedge legs 22 results in that an increased holding force or clamping force is generated transversely to the axial direction of the outer tube 14 or in the axial direction of the clamping bolt 20. The clamping device 18 is hereby mounted on the clamping bolt to such an extent that the holding or clamping force achieved hereby increases considerably and a further movement of the outer tube 14 or of the first outer tube part 36 is made impossible. In the first phase of the displacement of the outer tube together with the clamping wedges 24, a start-up peak of the crash force is avoided, as the impact energy is hereby converted to kinetic energy of the outer tube and the clamping wedges 24. The clamping force only increases in the further course of the movement.

In the present embodiment, a friction coefficient between the first outer tube part 36 and the corresponding clamping wedge 24 is thereby selected to be higher than a friction coefficient between the respective clamping wedge 24 and the corresponding console wedge leg 22. In other words, it is achieved hereby that the clamping wedges 24 are moved in the axial direction of the outer tube 14 during a displacement of the first outer tube part 36 caused by an accident, namely relative to the console wedge legs 22. It would thereby also possibly be conceivable to connect the clamping wedges 24 rigidly to the first outer tube part 36.

FIG. 2 accordingly shows the position of the clamping wedges 24 or of the outer tube 14 with the first outer tube part 36, in which the clamping wedges 24 or the first outer tube part 36 have been dislocated forward correspondingly by a respective path S in the axial direction, wherein a holding or clamping force of the clamping device 18 has adjusted itself, which results in that the first outer tube part 36 remains in place relative to the console 10 during the further course of the accident scenario.

The further course of the accident scenario is shown in FIG. 3. After the first outer tube part 36 is fixed in a stationary manner due to the increased holding force at the console wedge legs 22 or the console 10, the displacement of the second outer tube part 38 (which can be seen in FIG. 3) now further takes place relative to the first outer tube part 36, namely while absorbing energy. Thereby, corresponding energy absorption elements are presently provided between the two outer tube parts 36, 38.

Altogether, it can thus be seen from the figures that, with the forward dislocation or axial displacement of the outer tube 14 or of the first outer tube part 36—and therewith simultaneously of the clamping wedges 24—caused by an accident, a continuously increasing holding force or clamping force is generated in dependence on the overload exerted on the steering column 16 which finally leads to the first outer tube part 36 being fixed in a relative stationary manner with regard to the console 10. The normal force acting on the clamping surfaces increases thereby. The continuously increasing holding force can thereby result in that a plastic deformation in the region of the clamping device 18 can take place when a holding limit force is exceeded. In other words, the continuously increasing holding force can pass into those regions until a plastic deformation of the components and thus a form-fit blockade of the clamping device 18 result.

The console wedge legs 22 have respective stops 42 in the present embodiment, by means of which an axial displacement of the clamping wedges 24 can be limited. A maximum force introduced into the clamping system can also be limited hereby.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claim is:

1. A steering column arrangement for a motor vehicle having a vehicle-side console, said steering column arrangement comprising:
   an outer tube of a steering column;
   a clamping device by which said outer tube is attached to the vehicle side console in a releasable manner; and
   a steering shaft carried by said outer tube of said steering column; wherein,
   the clamping device comprises at least one clamping wedge arrangement which generates an increased holding force of the clamping device during an axial displacement of the outer tube caused by an accident,
   the clamping wedge arrangement comprises two clamping wedges arranged laterally of the outer tube,
   said wedges cooperate with corresponding console wedge legs of the console for generating the holding force during an axial displacement of the outer tube caused by an accident, and
   each of the console wedge legs surround the corresponding clamping wedge.

2. The steering column arrangement according to claim 1, wherein the clamping wedges are displaceable with the outer tube in its axial direction.

3. The steering column arrangement according to claim 1, wherein a higher friction coefficient is provided between the clamping wedges and the outer tube than between the clamping wedges and the corresponding console wedge legs.

4. The steering column arrangement according to claim 1, wherein:
   the clamping wedges are provided with elongated holes extending in the axial direction of the outer tube; and
   a clamping bolt of the clamping device extends through said holes.

5. The steering column arrangement according to claim 1, wherein, when a holding force limit is exceeded, a plastic deformation takes place in a region of the clamping device.

6. The steering column arrangement according to claim 1, wherein:
   the outer tube comprises a plurality of parts;
   a first outer tube part can be charged with the increased holding force of the clamping device during an axial displacement of the outer tube caused by an accident; and
   a second other outer tube part can be moved relative to the first outer tube part while absorbing energy.

7. The steering column arrangement according to claim 1, wherein a further clamping element of the clamping device is arranged on the outer side of the console wedge legs.

8. The steering column arrangement according to claim 1, wherein the console wedge legs have a respective stop, which limits axial displacement of the clamping wedges.

* * * * *